Sept. 4, 1934.    J. R. PEIRCE    1,972,164
COFFEE BREWING AND PERCOLATING DEVICE
Filed Nov. 12, 1932    2 Sheets-Sheet 1

INVENTOR.
John Royden Peirce
BY
A. C. Mahy
ATTORNEY.

Sept. 4, 1934.   J. R. PEIRCE   1,972,164
COFFEE BREWING AND PERCOLATING DEVICE
Filed Nov. 12, 1932   2 Sheets-Sheet 2

INVENTOR.
John Royden Peirce
BY
A. A. Maky
ATTORNEY.

Patented Sept. 4, 1934

1,972,164

UNITED STATES PATENT OFFICE 1,972,164

COFFEE BREWING AND PERCOLATING DEVICE

John Royden Peirce, New York, N. Y.

Application November 12, 1932, Serial No. 642,335

2 Claims. (Cl. 53—3)

This invention relates to coffee brewing and percolating devices.

In most devices designed for the making of coffee it is customary to cause or permit the water to become heated to boiling point. This has been found by scientists to be detrimental to the production of the best coffee as boiling water and the steam produced at that temperature serve to extract undesirable properties from the grounds.

In addition to this most systems and devices rely too largely upon attendants to perform certain acts at some time in the process of making the coffee. The time of performing these acts is usually arrived at by guess work or convenience while the attendant is doing other things.

One of the objects of this invention is to produce a device for making coffee, which will operate in accordance with scientific principles developed over long periods of time through wide varieties of experiments.

Another object is to produce such a device which will operate automatically so as to operate correctly without the necessity of attention from an attendant.

Another object is to remove the necessity of attention from an attendant during the making of the coffee.

Another object is to produce a device of this character which is simple in its construction and at the same time rugged and easy to operate.

Referring to the drawings in which I have shown what I now consider to be the preferred form of my invention:

Figures 1, 5:
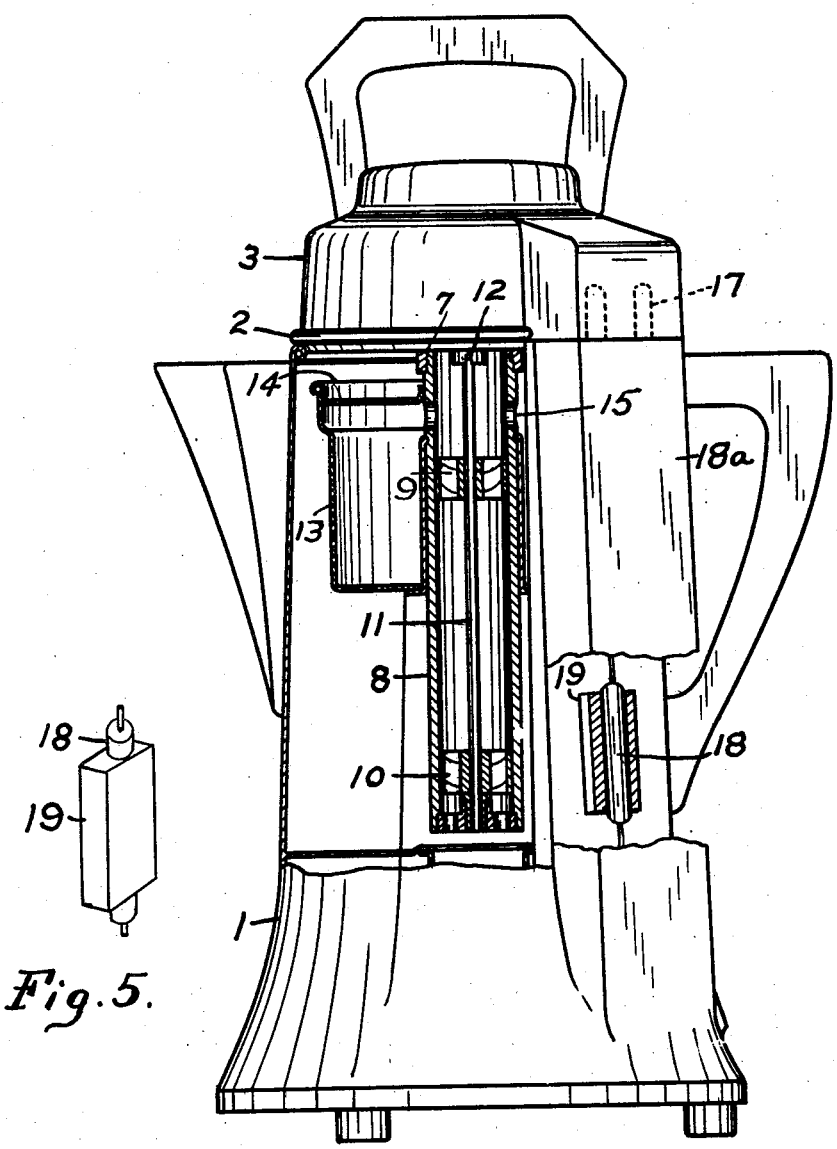
Fig. 1 is a side elevation of a coffee pot, partly in section, embodying my invention.
Fig. 5 is a perspective view of a thermostatic device used to control the operation of the coffee pot.
Figure 2:
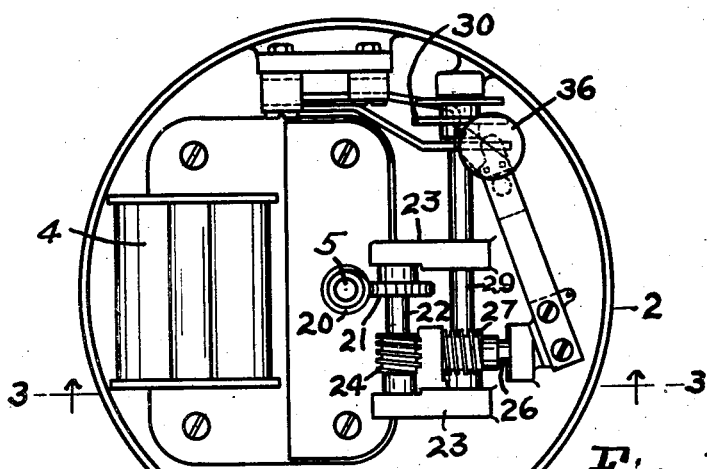
Fig. 2 is a plan view of the operating mechanism contained in the cover of the pot with the upper part of the cover removed.
Figure 3:
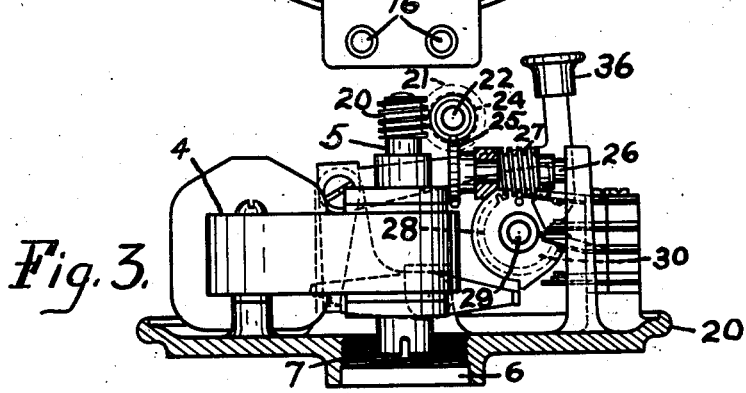
Fig. 3 is a section taken on line 3—3 of Fig. 2.

In the drawings 1 represents the coffee pot which is provided with a cover having a base portion 2 and an upper portion 3. The base portion of the cover supports an electric motor 4 having a shaft 5. An opening 6 may be provided with threads 7 to which a pump tube 8 is attached. Within this tube two water lifting turbines 9 and 10 are provided. The shaft 11 of these turbines is connected to the shaft 5 of the motor as shown at 12. The coffee grounds basket 13 may be detachably carried by the tube 8 and is provided with the usual small perforations to permit water to pass through while holding back the grounds. A cover 14 is provided for the basket to prevent the water which is pumped into the basket through the holes 15 from flowing over the top of the basket and back into the pot without passing through the grounds. With this construction the water is pumped into the basket at a rapid rate so that it fills the basket and the pressure caused by the continued pumping operation causes the water to be forced through the grounds more rapidly than is usual in percolating systems. This brings about the completion of the combined brewing and percolating operation more quickly so that the process may be stopped before the grounds begin to give up their undesirable properties or otherwise adversely influence the brew.

By using two pumping devices or turbines, the water may be pumped into the grounds basket and through the grounds with the desired force by a motor of relatively low power and operating quietly and at a relatively low speed.

When the grounds have been placed in the basket and the latter attached to the tube 8 which depends from the cover of the pot, the cover is then put in place on the top of the pot. This connects the motor 4 to the electric current through plug holes 16 which cooperate with terminals 17 carried by the pot. The motor does not begin to operate to pump water, however, until the temperature of the water reaches the desired point of about 200 degrees Fahrenheit. This is controlled by a thermostat 18 attached to the side of the pot. A metallic holder 19 soldered or otherwise attached to the wall of the pot becomes heated as the water in the pot is heated. The thermostat tube is inserted in a bore in the member 19 and is influenced by the temperature. The thermostat is enclosed by a casing 18a which also houses the electric connections to the heating element and to the operating and control mechanisms. At about 200 degrees the thermostat operates to cause the pumping operation to begin. Then at the end of a predetermined length of time the pumping operation is stopped automatically and the coffee is ready for serving.

The control mechanism is operated by the motor 4 through reduction gearing. The motor shaft 5 is provided with a worm 20 meshing with a worm wheel 21 on a shaft 22 supported in bearing standards 23. A worm 24 on shaft 22 meshes with a worm wheel 25 on a shaft 26. This shaft has a worm 27 meshing with a worm wheel 28 on shaft 29. This shaft carries a cam disc 30 which controls the stopping of the pumping operation.

Figure 4:
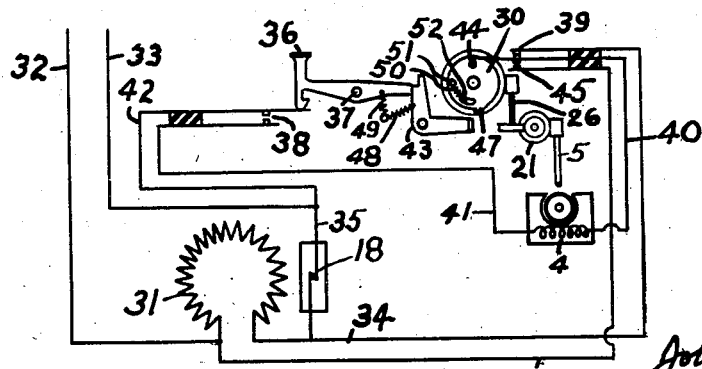
Fig. 4 is a wiring diagram of the heating and operating control of the device.

Referring to the wiring diagram in Fig. 4, the heating coil which is contained in the lower part of the pot to heat the water, is shown at 31. When the cover of the pot is put in place, the coil is connected to the current supply lines 32, 33 through the thermostat which is normally closed as shown. The current passes from line 32, through the coil 31, wire 34, thermostat 18, wire 35 and back to the other side of the line 33.

When the operator places the cover of the pot in place, he will depress the operating key 36 which is pivoted at 37. This closes contacts 38 but the motor does not operate yet because the current has a path of less resistance through the thermostat 18. But when the thermostat 18 opens the current will be forced to pass from the coil 31, through wire 34, contacts 39 which are normally closed, wire 40, motor 4, wire 41, contacts 38 now closed, wire 42 and back to the other side of the line 33. When the key 36 is depressed it is locked down by a latch 43.

Within a few seconds after the thermostat opens and the motor 4 begins to operate and the cam 30 starts to turn (counterclockwise), a pin 44 fixed to the cam and normally holding the contacts 39 closed, releases the middle contact leaf, permitting it to drop. This opens contacts 39 and closes contacts 45. The motor circuit will then be as follows: From line 32, through wire 46, contacts 45, wire 40, motor 4, wire 41, contacts 38, wire 42 and back to the other side of the line 33. The current then passes around the heating coil 31 so that the heating of the water stops, as it is not desired to heat the water beyond approximately 200 degrees.

Now when the temperature of the water begins to fall below 200 degrees, the thermostat will close again to raise the temperature of the water. As the motor circuit now passes around the heating coil, by way of wire 46, the motor will continue to operate until its circuit is broken at contacts 38. The motor and heating coil are now connected in parallel.

After the motor 4 has operated for a predetermined length of time, the high portion 47 of cam 30 will engage the rear end of latch 43 and rock it against the action of its spring 48, releasing the operating key 36 so that its spring 49 will rock it to its inoperative position, permitting contacts 38 to open.

The cam disc 30 is mounted on the shaft 29 with a slight lost motion. This is effected by having the cam loose on the shaft and connected to the latter by a spring 50. The spring is connected at one end to a pin 51 in the cam disc and at the other end to a pin 52 reaching through a slot in the cam disc and attached to the shaft 29. As the cam engages the latch 43 and presses it down, the friction will cause the cam to lag and the spring 50 will stretch. Then after the key 36 has been released and the cam moves out of contact with the latch, the spring 50 will jump the cam ahead slightly to take up the lost motion. This serves two purposes. The motor stops its operation at this time and the spring moves the cam point 47 out of the way of the latch 43 so that the latter will be free to operate the next time the operating key is depressed. Also as the cam steps ahead, the pin 44 engages the middle leaf of the contacts 39, 45, closing contacts 39 and opening contacts 45. The parts will then be in their normal or starting positions. The thermostat will continue to control the heating coil to maintain the temperature of the coffee at approximately 200 degrees as long as the device is connected to the electric source and the current is permitted to flow.

I have spoken of a temperature of 200 degrees being more or less constantly maintained. This can be done by placing the thermostat in more intimate relation with the water in the pot. There are advantages, however, in causing the water to first be heated to a higher temperature than that at which it is to be maintained thereafter. By first heating the water to, say 206 degrees, the greater part of the brewing will take place at the higher temperature, but below boiling point. Then by maintaining the temperature at approximately 200 degrees thereafter, it will be in more ideal condition as far as temperature is concerned, for serving. These results can be attained by mounting the thermostat on the outer wall of the pot and enclosed as shown in the drawings. With this arrangement, when the water is first heated, the heating of the thermostat tends to lag behind the heating of the water, so that the water rises to a relatively high temperature before the thermostat operates. Then when the thermostat is once heated through, it will respond more rapidly to subsequent rises in the temperature of the water, and therefore the water does not have to rise to the same relatively high temperature to cause the heating circuit to be opened.

Having described my invention, what I claim and desire to secure by Letters Patent is:

1. In a coffee brewing device, a water container, a grounds container associated therewith, a motor and a pumping device for delivering water from the first named container to the grounds container, an electric water heating element associated with said first named container, means for connecting the motor and said element in series for operation, and means brought into operation during the brewing process for causing the motor and heating element to be connected in parallel to the electric supply source.

2. In a coffee brewing device, a water container, a grounds container associated therewith, an electric heating element for heating water in said first named container, electrically operated means for pumping water from the first to the second named container, thermostatic control means for initiating operation of said pumping means, and means operated by said pumping means for controlling the relative electric connections between the heating element, the pumping means and the electric supply source.

JOHN ROYDEN PEIRCE.